Feb. 24, 1925.
K. W. THALHAMMER
CAMERA
Original Filed Jan. 13, 1920   3 Sheets-Sheet 1
1,527,285
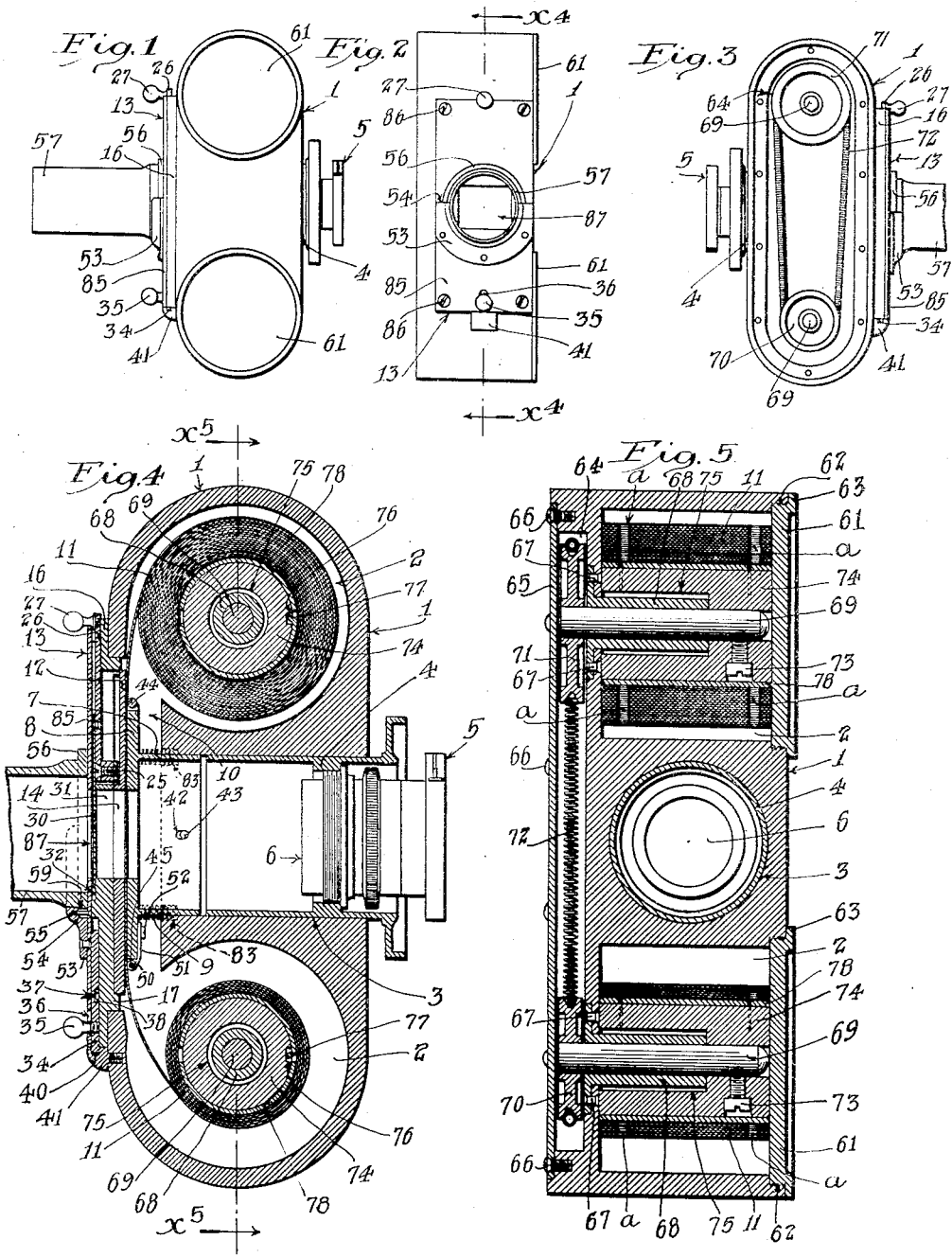
Witness
Sully Russo
INVENTOR.
Karl W. Thalhammer
BY Frederick Whyon
ATTORNEY

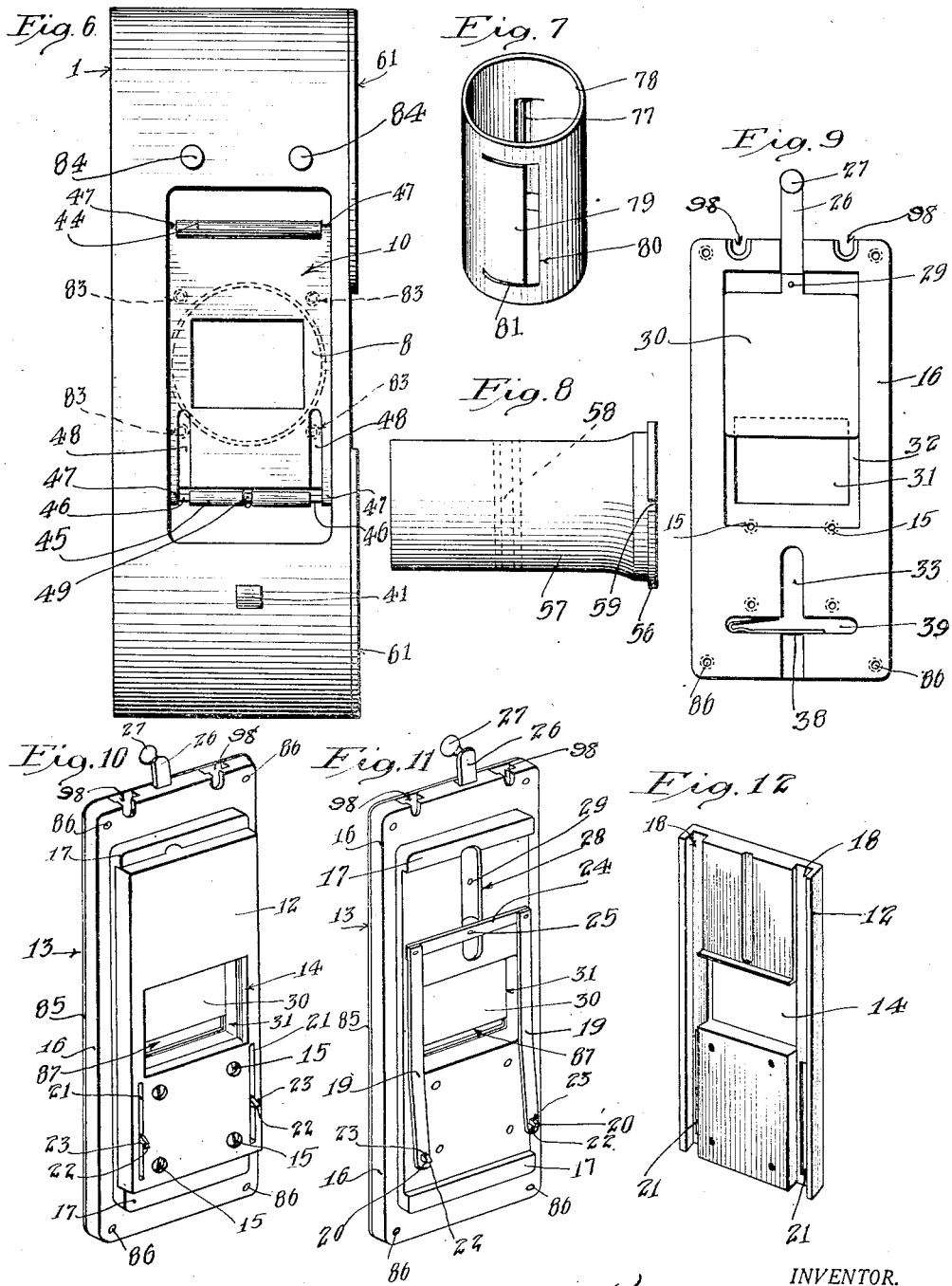

Feb. 24, 1925.
K. W. THALHAMMER
CAMERA
Original Filed Jan. 13, 1920   3 Sheets-Sheet 3
1,527,285
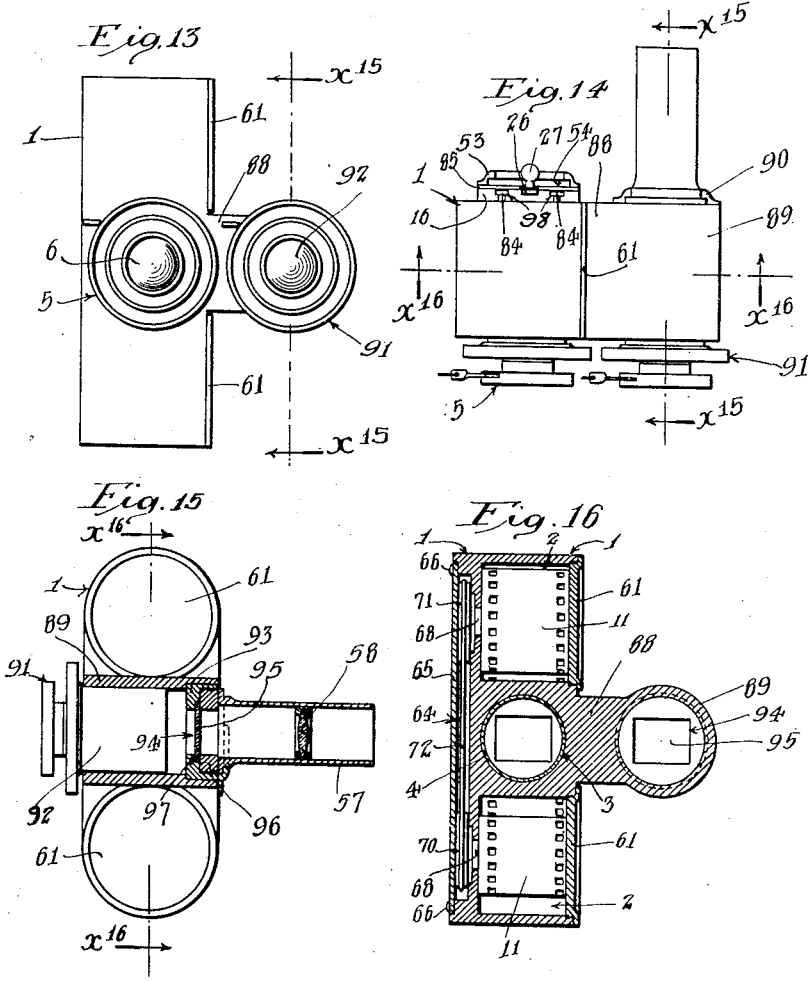

Patented Feb. 24, 1925.                                                                                          1,527,285

UNITED STATES PATENT OFFICE.

KARL W. THALHAMMER, OF LOS ANGELES, CALIFORNIA.

CAMERA.

Application filed January 13, 1920, Serial No. 351,176. Renewed July 14, 1924.

*To all whom it may concern:*

Be it known that I, KARL W. THALHAMMER, a citizen of Austria, having declared my intention of becoming a citizen of the United States, residing at Los Angeles, in the county of Los Angeles, State of California, have invented a new and useful Camera, of which the following is a specification.

This invention relates to cameras of the type capable of employing roll or strip film, and an object of the invention is to produce a camera which can be conveniently used for various purposes in connection with motion picture work and also independently to take pictures such as are produced by the ordinary type of camera.

Another object of the invention is to provide a camera which is of convenient form for use in connection with the selection of "locations" or, in other words, the setting in which motion picture scenes are to be enacted.

Another object is to provide a camera of this description which can be conveniently used for ascertaining the correct illumination of the object or objects which are to enter into the series of "exposures" on a motion picture film.

Another object is to provide a camera in which focusing and the degree of illumination can be readily observed directly on the film.

Another object is to make provision for observing the focusing and the degree of illumination without exposing any of the film while so observing.

Another object is to make provision for advancing the film, a distance corresponding to the length of one "frame" or exposure, when the focusing slide is closed.

Another object is to provide an improved spool construction for holding the film strip or roll.

Another object is to provide simple and serviceable film engaging means for the spools.

Another objects and advantages will appear in the subjoined detailed description.

The accompanying drawings illustrate the invention.

Figure 1 is a side elevation of a camera embodying the invention.

Fig. 2 is a rear elevation from the left of Fig. 1.

Fig. 3 is an elevation of the opposite side of the camera from that shown in Fig. 1, the focusing magnifying lens barrel being partly broken away.

Fig. 4 is an enlarged vertical midsection on line indicated by $x^4$—$x^4$ Fig. 2.

Fig. 5 is a sectional elevation indicated by $x^5$—$x^5$ Fig. 4.

Fig. 6 is an enlarged rear elevation similar to Fig. 2 excepting that the gate is omitted.

Fig. 7 is a perspective view of one of the spool cylinders.

Fig. 8 is a longitudinal view of the focusing magnifying lens barrel.

Fig. 9 is an outer face view of the intermediate gate plate with the slide in place therein, the slide being shown in partly open position.

Fig. 10 is a perspective view of the gate detached.

Fig. 11 is a perspective view of the gate with its inner plate removed so as to expose to view the film moving mechanism.

Fig. 12 is a perspective view of the inner plate of the gate.

Fig. 13 is a front elevation of a modified form of the invention.

Fig. 14 is a plan view of Fig. 13.

Fig. 15 is an elevation partly in section on line indicated by $x^{15}$—$x^{15}$, Figs. 13 and 14.

Fig. 16 is a sectional elevation on line indicated by $x^{16}$—$x^{16}$, Figs. 14 and 15.

Fig. 17 is an elevation of the window closure.

There is provided a body 1 having at its opposite ends film magazine chambers 2 and intermediate of said magazine chambers a transversely extending orifice 3 in which is shiftably mounted the bushing 4 of a lens mounting 5 which may be of the usual or any preferred construction. By shifting the bushing 4 in and out the focus of the object lens 6 may be changed in a manner well understood in this art.

In the orifice 4 and alined with the bushing 3 is a bushing 7 projecting inwardly from a presser plate 8, said presser plate being yieldingly held outward by coil springs 9 positioned in recesses 83 in the body 1. The body 1 is provided with a recess 10 in one face thereof so as to accommodate the presser plate 8. The presser plate 8 holds the film strip, such as that indicated at 11, flat against the inner face of an inner plate 12 of a gate, indicated in general by the character 13. The plate 12 is provided with a window 14, the margins of which determine the size of the "frames" or exposures produced on the film strip when said strip is exposed to light rays passing through the object lens.

The inner plate 12 is fastened by screws 15 to the intermediate plate 16 of the gate 13. The ends of the plate 12 are engaged by inwardly extending lugs 17 of the intermediate plate 16. The plate 12 is provided in its inner face with longitudinally extending grooves 18 to accommodate spring arms 19 which are provided at their free ends with detents or claws 20, adapted to engage the perforations a in the film strip 11 so as to move said film strip when the arms 19 are moved downwardly in Fig. 11. The claws 20 extend through slots 21 in the inner plate 12. The claws 20 have straight front faces 22 and beveled rear faces 23, the straight faces bearing against the film strip when the arms 19 are moved downwardly, and the beveled faces 23, when engaged by the film in the upstroke of the arms 19, causing the claws to be retracted so as to slide from the perforations which they engage. The arms 19 are sprung or flexed inwardly for at least a portion of their length so as to normally hold the claws in perforation-engaging position.

The arms 19 are connected at their upper ends to a yoke 24 which in turn is fastened by a screw 25, or its equivalent to an operating member in the form of an arm 26 provided at its free end with a knob 27 that can be grasped by the operator to cause the arms 19 to be moved up or down as desired. The arm 26 is accommodated in a groove 28 extending longitudinally in the intermediate plate 16. The arm 26 is detachably connected by a pin 29 to a slide 30 adapted to close a window 31 in the intermediate plate 16 when the arm 26 is moved in a direction to cause the claws 20 to advance the film strip. The window 31 is of substantially the same size as the window 14 and registers therewith, and the slide 30 when moved away from the window 31 is accommodated in a recess 32 formed in the outer face of the intermediate plate 16.

A latch is provided for the gate 13 and, in this instance, the latch is constructed as follows: The intermediate plate 16 is provided with a groove 33 in which is accommodated a latch bolt 34 provided with a knob 35 which extends through a slot 36 in the outer gate plate. The latch bolt is provided in its inner face with a transversely extending notch 37 engaged by a flat spring 38 which is disposed within a recess 39 extending transversely to the groove 33. The spring 38 is U-shaped and one leg thereof extends across the groove 33 and the other leg is engaged by the wall of the recess 39. The spring 38 is placed in the recess 39 while the spring is in compressed condition, thus the spring tends to hold the latch bolt outwardly in engagement with the notch 40 of a lug 41 mounted on the body 1. The gate plate 16 is provided at the end not having the latch bolt with notches 98 adapted to detachably engage studs 84 projecting from the rear face of the body 1. Thus the gate can be readily removed by withdrawing the latch bolt 34 from the notch 40.

To prevent the presser plate 8 from moving outwardly to too great an extent when the gate is removed, the bushing 7 is provided with slots 42 only one of which can be seen, from the nature of the view, in Fig. 4, said slots being engaged by the inner ends of pins or screws 43 projecting into the orifice 3 from the body 1. The slots 42 provide sufficient movement of the presser plate 8 so that the springs 9 will yieldingly hold the presser plate against the film and thus yieldingly hold the film strip against the inner gate plate 12.

The presser plate 8 is provided at its opposite ends with rollers 44, 45, respectively, said rollers having reduced ends 46 journaled in bearings 47 formed by the presser plate. The roller 44 is prevented from endwise movement by its bearings 47 which are spaced from one another just sufficiently to admit the larger portion of the roller between said bearings. The presser plate 8 is provided with longitudinally extending grooves 48 to accommodate the claws 20 and thus permit said claws to engage with the film strip. The reduced ends 46 of the roller 45 are sufficiently long to space the larger portion of the roller 45 from the inner faces of the associated bearings 47, thereby permitting the claws 20 to pass over the reduced ends of the roller 45 when the claws are in engagement with the film. Thus the roller 45 will not cause disengagement of the claws with the film as would otherwise be the case. In order to hold the roller 45 centrally between its bearings 47, the middle portion of the roller is provided with a reduced portion 49 which accommodates the outwardly bent end 50 of a finger 51 fastened by a screw 52 to the inner surface of the presser plate 8. Thus it is clear that the roller 45 cannot move endwise so as to bring the larger portion of the roller opposite the slots 48.

Fitting against the outer face of the intermediate gate plate 16 is the outer plate 85 of the gate and it is fastened by screws 86 to the intermediate plate. The outer plate 85 forms a cover for the recess 32, groove 33 and recess 39. The plate 85 is provided with a window 87 in alinement with the windows 14, 31.

The outer face of the outer gate plate 85 is provided with a recessed flange 53, the flange and recess being substantially semicircular and the recess being indicated at 54. Between the flange 53 and the adjacent portion of the plate 85 is a pin 55 which extends across the middle portion of the recess 54, that is adapted to accommodate the flange 56 of a lens-holding barrel 57, said barrel holding a magnifying focusing lens indicated at 58. This lens 58 is at the proper focal distance from the sensitized face of the film 11 so as to magnify any image which may be projected on the film by the object lens. The flange 56 is provided with a notch 59 adapted to be engaged by the pin 55 when the barrel 57 is assembled in position. When the barrel is in position in the flange 53 the windows 14, 31, 87 are axially alined with the barrel. The pin 55 prevents the barrel 57 from turning. It is evident that the barrel 57 may be readily detached by slipping the flange 56 out of the recess 54. When it is desired to close the window 87, to prevent light entering said window and striking the film, the barrel 57 may be removed and a disk 60, shown in Fig. 13, formed of some suitable light obstructing material, such as felt or the like, may be inserted in the recess 54 so as to lie flat against the margins of the window 87 of the outer plate. When the window is so closed, it is obvious that the slide 30 may be moved into open position without admitting light to the film through the windows.

The magazine chambers 2 extend to one side of the body 1 and are closed at said sides by plugs 61 which are screw-threaded into enlarged portions 62 of the magazine chambers. The plugs 61 are provided at their outer ends with flanges 63 which seat against the outer surface of the body when the plugs are in place. The opposite side of the body 1 is provided with a recess 64 closed by a cover 65 which is attached to the body by screws 66. Fastened to the body 1 by rivets 67, or their equivalents, are elongate bearings 68 which project a considerable distance inside of the magazine chambers. These bearings 68 serve to journal shafts 69 which project into the recess 64. The projecting ends of the shafts 69 are provided with pulleys 70, 71 and the pulleys are connected with one another by a driving connection in the form of a helical spring belt 72.

Detachably fastened to the shafts 69 by set screws 73, or their equivalents, are spool cores 74 which are provided with recesses 75 at one end to accommodate the inwardly projecting portions of the bearings 68, said recesses being of greater diameter than the bearing 68. The spool cores 74 are provided with longitudinally extending grooves 76 in their peripheries and detachably engaging said grooves are splines 77 extending inwardly from spool sleeves 78. In the particular instance shown in the drawing the splines 77 are formed by making a longitudinal slit in each of the sleeves and bending inwardly one marginal wall of the slit to form the splines. Thus it is clear that when the plugs 61 are removed the sleeves 78 may be readily slipped off of the cores 74.

Each of the sleeves 78, as clearly shown in Fig. 7, is provided at one side with a tongue 79 which is formed by making a longitudinal slit 80 in the collar and circumferentially extending slits 81 at the ends of the slit 80. The tongue 79 is sprung outwardly slightly and is of slightly less width than the film strip, the film strip being substantially of a width corresponding to the length of the sleeve. To fasten the film to the sleeve, one end of said film will be inserted beneath the tongue 79, the marginal portions of the film extending beyond the ends of the tongue. Then the film will be wrapped around the sleeve so that the film will bind upon the tongue 79. The end of the film will be held tightly in the cuts 81 because of the spring character of the tongue 79, and when the film is drawn taut it tends to force the tongue 79 inwardly so as to bind said tongue tighter upon the film. It is preferable that the manufacturer of the film supply the film rolled on one of the sleeves 78 or on one similar to the one described, and the operator of the camera will then secure the free end of the film to one of the sleeves as above described, and both sleeves will then be slipped upon the cores 74, the film at the same time being threaded over the presser plate 8. This may be done with the gate in place or removed, but the latter is preferred.

It is noted that the pulley 70 is of smaller diameter than the pulley 71 and the reason for this is that the claws 20 operate in a direction to pull the film from the spool having the larger pulley 71, thus driving the pulley 71 and this in turn producing faster rotation of the pulley 70 than the pulley 71 so that the tendency is for the spool having the pulley 70 to wind the film faster than it is unrolled from the spool having the pulley 71. Thus the film will always be held taut so as to lie perfectly flat across the window 31.

In the modification shown in Figs. 13 to 16 inclusive the body 1 is provided with a laterally extending bracket 88 supporting an integrally formed barrel 89 which is provided at its rear end with a flange 90 corresponding to the flange 53, above described. The axes of the barrel 89 and orifice 3 are parallel. The flange 90 enables the operator to place the lens barrel 57 in axial alinement with the barrel 89. The barrel 89 is provided at its forward end with a lens mounting 91 carrying an object lens 92. The object lens 92 is preferably of such size as to include a larger or smaller field of view than that which can be included within the angle of the object lens 6. This enables the operator to employ either of the object lenses, at will, by merely exchanging one for the other.

Inserted in the rear end of the barrel 89 is a bushing 93 having a window 94 in which is mounted a ground glass 95, that forms a member on which the image may be projected by the object lens so that the lens may be properly focused and the image thus produced observed by viewing the image through the magnifying lens 58. The ground glass 95 is held in place by a nut 96 screw-threaded into the bushing 93 against the ground glass, said ground glass having its margins accommodated in a recess 97 formed in the outer face of the bushing 93. The outer face of the nut 96 is flush with the outer surface of the body 1, and the inner end of the barrel 57 is adapted to rest against the outer face of the nut 96.

In practice, if it be desired to select a location or setting for the enactment of a motion picture drama, the person delegated to such duty will choose a location which is thought by him to be suitable for the particular scene which is to be recorded by the motion picture camera, and he will hold or suitably support the camera in such position as to cause the object lens 6 to project the image of the scene on the film strip 11. He may then, if he desires to view the image on the film, open the slide 30 and look through the lens barrel 57 so as to magnify the image and therefore bring out the details therein to better advantage for his observation.

The lens mounting 5 is provided with the usual iris diaphragm and mechanism for increasing and diminishing the size of the aperture in the diaphragm and therefore the operator, when viewing the image, will not only note the appearance of the scene and its confines, but will also observe the amount of light entering the camera through the diaphragm. If, in his judgment, the amount of light admitted to the camera is insufficient for producing good exposures on a film exposed in a motion picture camera in the usual manner, he will adjust the diaphragm so as to increase the size of the aperture therein, or if the light is judged to be too strong he will decrease the size of said aperture. He will then note the size of the aperture as denoted by the usual scale marked on the lens mounting. The lens will be focused in the usual manner so as to produce a sharp image on the film strip and, of course, the degree of sharpness of the image can be readily noted by the operator.

When the focus and degree of illumination of the film are judged to be proper for the exposure, the barrel 57 will be detached and the closure 60 substituted therefor and the arm 26 will be operated to close the slide 30 and to advance the film strip one step so as to bring an unexposed portion of the film opposite the object lens 6.

The exposure will then be made in the usual manner, the shutter, not shown, being operated for this purpose as is readily understood in this art. Then the arm 26 will be operated to open the slide 30 and to retract the claws 20 so as to cause said claws to engage a new set of perforations in the film strip. Then the arm 26 will again be moved downward to close the slide 30 and to advance the film strip another step so as to bring an unexposed portion of the strip in line with the lens 6. The slide may now be operated, if desired, to again observe an image on the film strip.

Instead of opening the slide and observing the image on the film strip, the modification shown in Figs. 13 to 16 of the drawings may be employed in the following manner: After selecting whichever size lens it is desired to use for making the exposure, the operator, if the desired lens happens to be, for example, the lens 6, will exchange the lens mountings 5 and 91 and he will then observe the image projected by the lens 6 upon the ground glass 95. He may, if he desires, place the lens barrel 57 in line with the ground glass as clearly shown in Fig. 14 so as to magnify the image on the ground glass. When the operator is satisfied as to the focus of the lens and the degree of illumination, determined by the diaphragm aperture, he will again exchange the lens mountings 5 and 91 so as to bring the lens 6 in front of the film and he will make the exposures by operating the shutter of the lens 6, or whatever lens is being used at the time for the object lens of the camera. The advantage of the modified form of the invention over that previously described is that none of the film will be wasted by fogging it in the operation of opening the slide 30 for, in the modified form, the closure 60 will be constantly kept in position to close the window 87.

It is understood that, if artificial lighting is being employed in the scene being photographed, the degree of illumination of the scene will be regulated in accordance with the judgment of the operator before he makes the exposure.

One or more exposures of the scene or any number of exposures of different selected scenes may be made and then the strip of exposed film will be developed, in a manner well understood in the photographic art, so that the operator can ascertain whether or not the size of the diaphragm aperture, the illumination and the focusing of the lens, are correct for production of the motion picture negative film to be subsequently exposed to the scene or scenes which have been recorded on the film 11.

Also the director may view the exposed film, or have positives printed from the negative film and then have the images on the positive projected on to a screen, so that he may judge of the suitability of the setting for portrayal of the scene to be recorded by the motion picture camera.

If the size of the diaphragm aperture, or the degree of illumination are not correct, or if the director does not approve of the location, alterations will be made in an effort to remedy the defect or defects and other exposures will be made and the film developed; and these operations will be repeated until the degree of lighting is correct and the location meets with the approval of the director. The motion picture camera, not shown, will then be set up in the same location as occupied by the camera and the diaphragm adjusted to correspond with the adjustment of the diaphragm of this camera, as noted at the time that the successful exposures were made, and the actors will take their positions. Then the photographing of the scene with the motion picture camera will take place in a manner well understood in the motion picture art.

It is obvious that the invention may be used independently of motion picture photography to make the ordinary negatives.

It is understood that the invention is not limited to the exact details of construction shown in the drawings and above described, but that the invention also includes such changes and modifications as lie within the spirit and scope of the appended claims.

I claim:

1. In a camera, a body provided with magazine chambers and with an orifice, spools in the chambers respectively for holding a film, an object lens mounted in the orifice, a gate extending over the orifice opposite the lens, means mounted in the gate to engage perforations in the film, and means mounted in the gate to operate the perforation-engaging means.

2. In a camera, a body provided with magazine chambers and with an orifice, spools in the chambers respectively for holding a film, an object lens mounted in the orifice, a gate extending over the orifice opposite the lens and provided with a window, a slide movably mounted in the gate and adapted to close the window, means to move the film, and means to operate the slide and the film-moving means.

3. In a camera, a body provided with magazine chambers and with an orifice, spools in the chambers respectively for holding a film, an object lens mounted in the front end of the orifice, means to move the film, means at the rear end of the orifice to close said orifice, and means to operate the film-moving means and the orifice-closing means.

4. In a camera, a body provided with magazine chambers and with an orifice, spools in the chambers respectively for holding a film, an object lens mounted in the front end of the orifice, and means to simultaneously move the film and shut off the light at the rear end of the orifice.

5. In a camera, a body provided with magazine chambers and with an orifice, spools in the chambers respectively for holding a film, an object lens for the orifice, a closure for the rear end of the orifice, means to operate said closure, and means to engage and move the film.

6. In a camera, a body having an orifice and adapted to hold a film, a lens for the front end of the orifice, a gate fastened to the body at the rear end of the orifice, a movably mounted presser plate adjacent the inner face of the gate, means to yieldingly hold the presser plate toward the gate, and means to move the film.

7. In a camera, a body having an orifice and adapted to hold a film, a lens for the front end of the orifice, a gate having a window and fastened to the body at the rear end of the orifice, a closure for the window, a presser plate having an opening registering with the window, means to yieldingly hold the presser plate toward the gate, and means to move the film.

8. In a camera, a body having an orifice and provided with magazine chambers, spools for the chambers, an object lens for the orifice, a gate detachably fastened to the body, and means to yieldingly hold a film against the inner face of the gate.

9. In a camera, a body having an orifice and provided with magazine chambers, spools for the chambers, an object lens for the orifice, a gate detachably fastened to the body, and means mounted in the gate to engage the perforations in a film.

10. In a camera, a body having an orifice and provided with magazine chambers, spools for the chambers, an object lens for the orifice, a gate detachably fastened to the body, means mounted in the gate to engage the perforations of a film, means to operate the perforation-engaging means, and means to yieldingly hold the film toward the perforation-engaging means.

11. In a camera, a body having an orifice and provided with magazine chambers, spools for the chambers, an object lens for the orifice, a gate fastened to the body and extending across the orifice, a presser plate yieldingly mounted adjacent the inner face of the gate, and rollers mounted at opposite ends of the presser plate.

12. In a camera, a body having an orifice and provided with magazine chambers, spools for the chambers, an object lens for the orifice, a gate fastened to the body and extending across the orifice, a presser plate having a bushing slidably engaging the orifice, and springs to yieldingly hold the presser plate toward the gate.

13. In a camera, a body having an orifice and provided with magazine chambers opening to one face of the body, detachable plugs to close the outer ends of the chambers, bearings extending into the chambers from the opposite face of the body, shafts in the bearings, spools mounted on the shafts, and an object lens mounted in the orifice.

Signed at New York city, New York, this 1st day of January, 1920.

KARL W. THALHAMMER.

Witnesses:
   ROY S. SANFORD,
   CARRIE M. KINNER.